United States Patent [19]

Shibata

[11] Patent Number: 4,847,909
[45] Date of Patent: Jul. 11, 1989

[54] APPARATUS FOR PROCESSING AN X-RAY IMAGE

[75] Inventor: Kohichi Shibata, Ohtsu, Japan

[73] Assignee: Shimadzu Corporation, Kyoto, Japan

[21] Appl. No.: 179,460

[22] Filed: Apr. 8, 1988

[30] Foreign Application Priority Data

Apr. 30, 1987 [JP] Japan ................................ 62-107152

[51] Int. Cl.$^4$ .............................................. G06K 9/00
[52] U.S. Cl. ........................................ 382/6; 382/54; 358/111
[58] Field of Search ...................... 382/6, 54; 358/111; 364/413; 378/99

[56] References Cited

U.S. PATENT DOCUMENTS

| | | | |
|---|---|---|---|
| 4,409,615 | 10/1983 | McMann, Jr. et al. | 378/99 |
| 4,507,681 | 3/1985 | Verhoeven et al. | 358/166 |
| 4,607,284 | 8/1986 | Raven et al. | 358/166 |

Primary Examiner—Leo H. Boudreau
Assistant Examiner—Yonnie Jung
Attorney, Agent, or Firm—Griffin, Branigan & Butler

[57] ABSTRACT

An apparatus for processing an X-ray image, wherein an image signal newly obtained is allowed to pass through a recursive filter so as to allow objectionable lag to occur between that image and a plurality of images previously obtained. On the other hand, two-dimensional smoothing within a signal image is carried out when the image signal is processed in a smoothing circuit. The image signal taken from the recursive filter circuit is mixed with the image signal taken from the smoothing circuit. The mixing ratio for each picture element is determined by a motion detector, which compares each picture element of the present image signal with corresponding picture elements of the previous image signals and thereby detects the motion of each picture element. Thus the noise reduction by smoothing takes place more remarkably in the image of an object moving quickly, while the noise reduction resulting from the lag induced by the recursive filter takes place more remarkably in the image of an object moving slowly.

1 Claim, 2 Drawing Sheets

APPARATUS FOR PROCESSING AN X-RAY IMAGE

BACKGROUND OF THE INVENTION

The present invention relates to an apparatus for processing video signals representing an X-ray image obtained from an X-ray television camera, and more particularly to an apparatus for image information processing suitable for noise reduction.

An X-ray fluoroscopic system provided with an X-ray television camera has the disadvantages that the X-ray dosage can be increased only within a certain limit because of the necessity to restrain the X-ray dosage to which a subject is exposed. The result is that a fluoroscopic picture obtained from such a system inevitably contains noise.

A conventional way of noise reduction is to allow objectionable lag to occur by allowing video signals to pass through a recursive filter. The trouble is that, when an image in motion is allowed to pass through the recursive filter in the same manner as an image at a standstill, the leg shows itself in the form of a vague out-of-focus picture. In order to eliminate such vagueness, it is common to incorporate a motion detector, which allows the recursive filter to have a stronger effect on an object at a standstill and a weaker effect on an object in motion.

FIG. 2 shows the above-described construction of a recursive filter, into which a frame memory 6 for storing a frame of image is incorporated. The last frame of image is stored therein in the form of picture elements. Let it be supposed that one of them has a value B, which is multiplied by K in a multiplier 8. The corresponding one of picture elements, of which the present frame of image consists, has a value A, which is multiplied by (1-K) in a multiplier 2. The outputs taken from the multipliers 8 and 2 are fed to an adder 3, in which the following operation is performed:

$$A(1-K)+BK$$

The result of this operation is fed to the frame memory 6 and allowed to take the place of data hitherto stored therein. In the motion detector 11, each picture element of the present frame of image is compared with the corresponding picture element of the image stored in the frame memory 6. If the value of the picture element is found to have a change, it indicates that the object has moved. The value K is made small in this portion so as to allow the recursive filter to have a weaker effect.

Consequently the objectionable lag, as well as the out-of-focus picture resulting therefrom, hardly occurs in the image of the object in motion.

However, the fact that the above-described conventional construction allows the recursive filter to have a weaker effect on the object in motion is tantamount to the fact that the image of the object in motion is displayed without undergoing any processing for noise reduction. Thus the image of the object in motion contains noise.

SUMMARY OF THE INVENTION

It is an object of the present invention to provide an apparatus for processing an X-ray image in such a manner that the image of an object in motion, not to speak of the image of an object at a standstill, is suitably subjected to noise reduction so that a distinct image as a whole may be obtained.

The apparatus for processing an X-ray image in accordance with the present invention comprises a recursive filter means for allowing a lag to occur between a plurality of images, a smoothing means for carrying out two-dimensional smoothing within a single frame of image, a mixing means for mixing an image signal taken from the recursive filter means with an image signal taken from the smoothing means, and a motion detecting means for comparing each picture element of the present image signal with the corresponding picture elements of the previous image signals and, on the basis of the motion of each picture element detected from such comparison, determining a ratio in which each picture element is to be mixed in the mixing means.

An image signal newly obtained is allowed to pass through a recursive filter means so as to allow objectionable lag to occur between that image and a plurality of images previously obtained.

On the other hand, two-dimensional smoothing within a single image is carried out when the image signal is processed in the smoothing means.

The image signal taken from the recursive filter means is mixed with the image signal taken from the smoothing means. The mixing ratio for each picture element is determined by the motion detecting means, which compares each picture element of the present image signal with the corresponding picture elements of the previous image signals and thereby detects the motion of each picture element.

Thus the noise reduction by smoothing takes place more remarkably in the image of an object moving quickly, while the noise reduction resulting from the lag induced by the recursive filter means takes place more remarkably in the image of an object moving slowly.

Other and further details of the present invention are hereinafter described with reference to the accompanying drawings.

DESCRIPTION OF A PREFERRED EMBODIMENT

Figure 1:
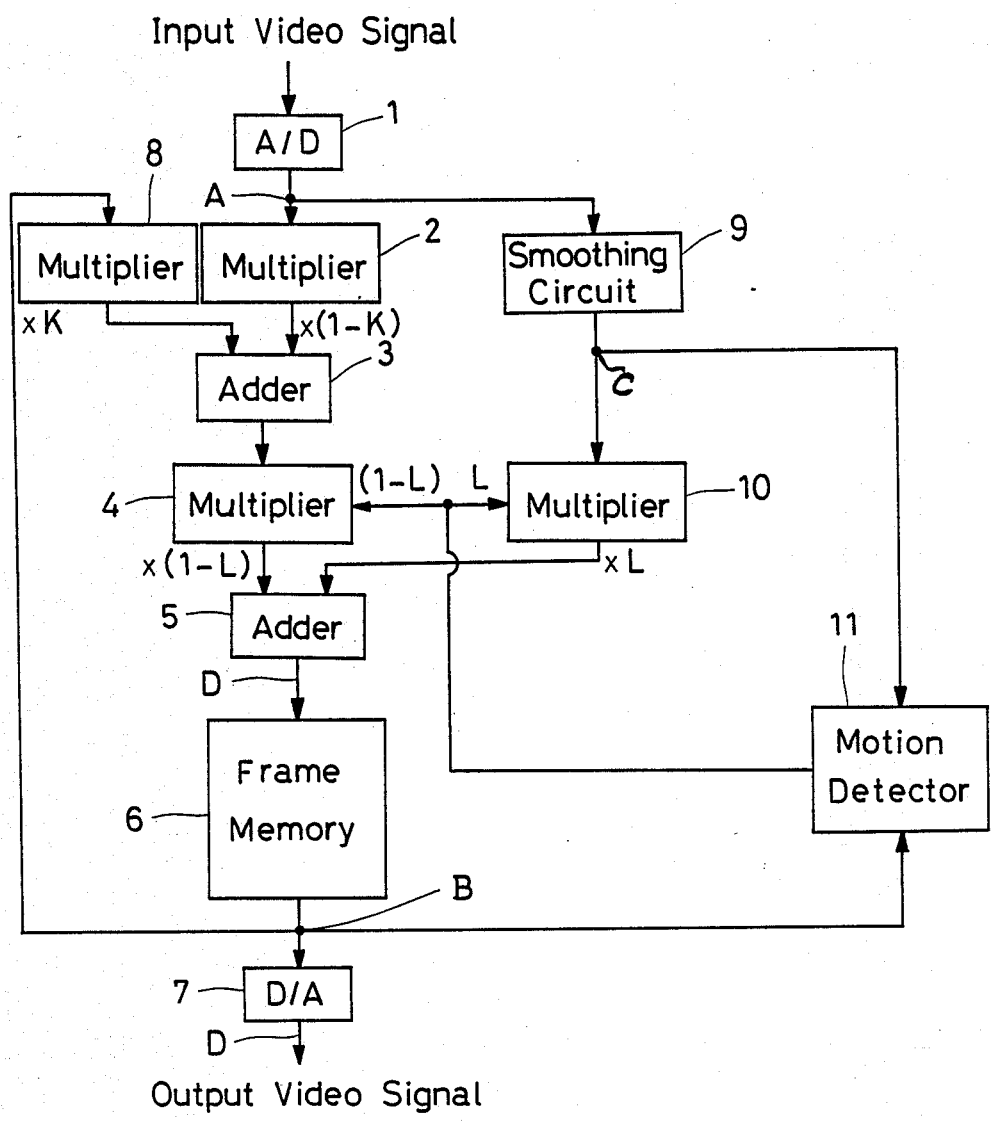
FIG. 1 is a block diagram of an embodiment of the present invention.
Figure 2:
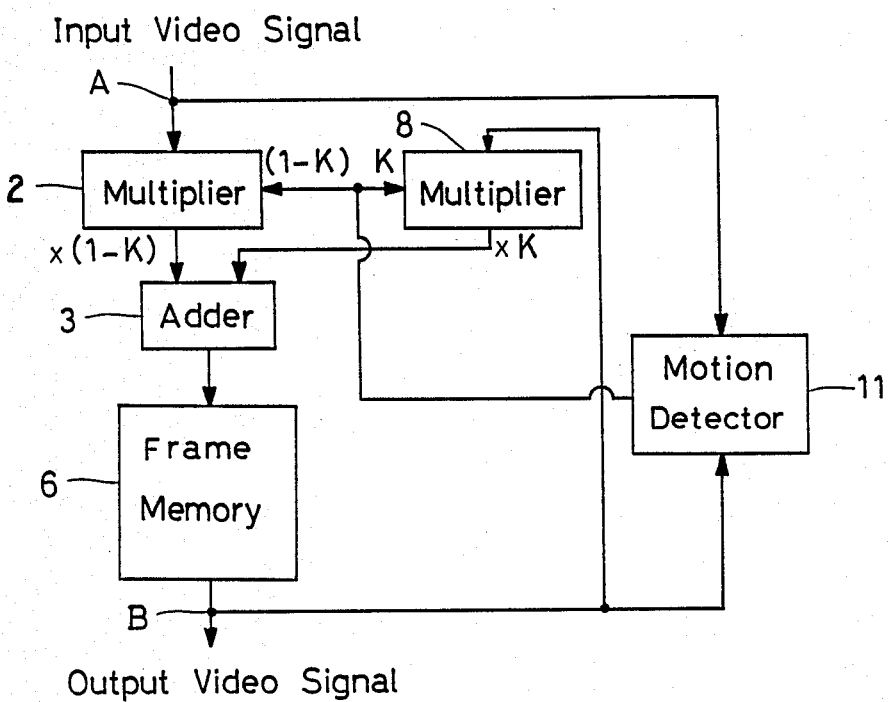
FIG. 2 is a block diagram of a conventional apparatus.

Referring now to FIG. 1, a video signal representing an X-ray image obtained from an X-ray television camera is converted into a digital signal in an analog-to-digital converter 1. The digital signal is fed to a multiplier 2, in which it is multiplied by $(1-K)$. The output taken from the multiplier 2 is fed to an adder 3. The last frame of the video signal has already been stored in a frame memory 6. The readout from this memory is fed to a multiplier 8, in which it is multiplied by K. The output taken from the multiplier 8 is also fed to the adder 3, from which an output is taken and fed to a multiplier 4, in which it is multiplied by $(1-L)$. The output taken from the multiplier 4 is fed to an adder 5.

The output taken from tha analog-to-digital converter 1 is fed to a smoothing circuit 9 as well, and subjected to two-dimensional smoothing within a single frame of image. The output taken from the smoothing circuit 9 is fed to a multiplier 10, in which it is multiplied by L. The output taken from the multiplier 10 is also fed to the adder 5.

The outputs taken from the multipliers 4 and 10 are summed up in the adder 5, from which an output is taken and fed to the frame memory 6 so that data stored therein may be renewed for each picture element. The renewed data is fed to a digital-to-analog converter 7, restored to an analog signal, and fed to a television monitoring apparatus (not shown) or the like.

Let it be supposed that a frame of image is transmitted from a camera at a certain moment, that a signal A represents one of picture elements of which the above-mentioned frame of image consists, that a signal B represents the corresponding one of picture elements which has already been stored in the frame memory 6, and that a signal C is obtained when another one of the picture elements of which the above-mentioned frame of image consists has passed through the smoothing circuit 9. Then an output D taken from the adder 5, i.e. a signal D which is allowed to take the place of data hitherto stored in the frame memory 6, is given by $$D = CL + [A(1-K) + BK](1-L)$$

The output taken from the smoothing circuit 9 and the readout from the frame memory 6 are fed to a motion detector 11, in which each picture element of the former is compared with the corresponding picture element of the latter so that the motion of each picture element may be detected. If the object moves, the value of the picture element changes and consequently a difference between the two signals changes. The more quickly the object moves, the larger the difference is. Contrariwise, a small difference results from the slow motion of the object. The difference is zero when the object is at a standstill. The values of $(1-L)$ and L to be given to the multipliers 4 and 10 respectively are changed according to the difference. The value of L is enlarged when the object is moving quickly and the difference is large. Contrariwise, the value of L is made small when the object is moving slowly and the difference is small. The value of L is zero for the picture elements representing an object at a standstill. In this case, the output taken from the smoothing circuit 9 does not take part in the addition in the adder 5. The value of L is 1 for the picture elements representing an object moving at high speed. In this case, the output taken from the adder 3 does not take part in the addition in the adder 5, but the output taken from the adder 5 is nothing more than the output taken from the smoothing circuit 9.

Thus the recursive filter has a stronger effect on an object moving slowly and allows an emphasized lag to occur. Contrariwise, the recursive filter has a weaker effect on an object moving quickly and consequently the lag is restrained from occurring and the image of such an object is apt to be two-dimensionally smoothed. Thus the noise reduction resulting from the lag takes place in the image of an object moving slowly, while the noise reduction by smoothing takes place in the image of an object moving quickly. The fact that, as a result of smoothing, the image of an object moving quickly is devoid of minuteness has nothing to be called in question substantially, because a quickly moving object cannot be actually seen to the minutest details.

From the foregoing, it will be apparent that the apparatus for processing an X-ray image in accordance with the present invention has a greater effect of smoothing the image of an object in motion and allowing the lag to be induced by the recursive filter more remarkably in the image of an object of a standstill so that both of the above-mentioned two images may be subjected to optimum noise reduction and a distinct X-ray image as a whole may be obtained.

What is claimed is:

1. An apparatus for processing an X-ray image said apparatus comprising:

a recursive filter means for allowing objectionable lag to occur between a plurality of images, each of said images comprising a plurality of picture elements;

a smoothing means for carrying out two-dimensional smoothing within a single frame of image;

a mixing means for mixing picture elmenets of an image signal taken from said recursive filter means with picture elements of an image signal taken from said smoothing means; and a motion detecting means for detecting motion of each picture element by comparing each picture element of a present image signal with corresponding picture elments of previous image signals and, depending on the motion of each picture element detected from such comparision controlling said mixing means to thereby determine a ratio in which each picture element is mixed in said mixing means.

* * * * *